No. 786,058. PATENTED MAR. 28, 1905.
F. SHUMAN.
PROCESS OF MANUFACTURING WIRE GLASS.
APPLICATION FILED APR. 7, 1904.

2 SHEETS—SHEET 1.

Attest
P. M. Kelly
Wm. Roonby

Inventor
Frank Shuman
By his Atty

No. 786,058. PATENTED MAR. 28, 1905.
F. SHUMAN.
PROCESS OF MANUFACTURING WIRE GLASS.
APPLICATION FILED APR. 7, 1904.

2 SHEETS—SHEET 2.

Attest
P. M. Kelly
Wm. Rooney

Inventor
Frank Shuman
By his atty

No. 786,058.

Patented March 28, 1905.

UNITED STATES PATENT OFFICE.

FRANK SHUMAN, OF PHILADELPHIA, PENNSYLVANIA.

PROCESS OF MANUFACTURING WIRE-GLASS.

SPECIFICATION forming part of Letters Patent No. 786,058, dated March 28, 1905.

Application filed April 7, 1904. Serial No. 201,946.

*To all whom it may concern:*

Be it known that I, FRANK SHUMAN, of the city and county of Philadelphia, State of Pennsylvania, have invented an Improvement in Processes of Manufacturing Wire-Glass, of which the following is a specification.

My invention has reference to processes for the manufacture of wire-glass; and it consists of certain improvements which are fully set forth in the following specification and accompanying drawings, which form a part thereof.

The subject of my invention is to provide an efficient method of manufacturing wire-glass which insures the positive embedding of the wire within the glass during the process of rolling.

In carrying out my invention I cause a mass of molten glass to be substantially divided into two parts, one of which parts is rolled down into a sheet with the meshed wire upon its surface and the other of which part is immediately rolled over the meshed wire, so as to embed or envelop it between the two portions of glass which coalesce and adhere through the meshes of the wire fabric.

In the preferred form of my improved method the division of the glass is made to take place during the rolling operation, so as to constitute a continuous process.

My invention will be better understood by reference to the accompanying drawings, which show a form of apparatus which I have found excellently adapted for carrying my improved process into practice, and in which—

Figure 1:
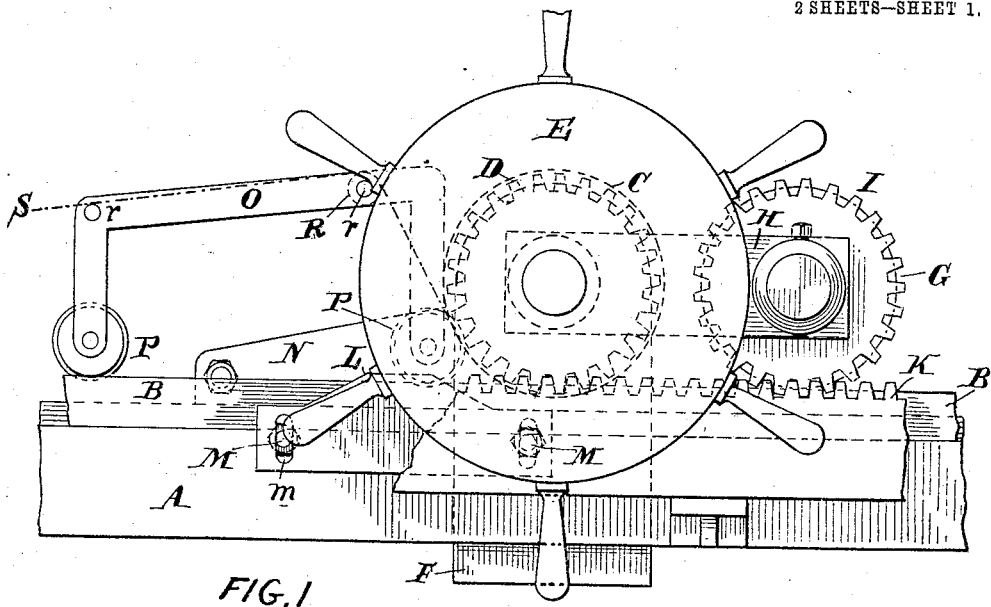
Figure 2:
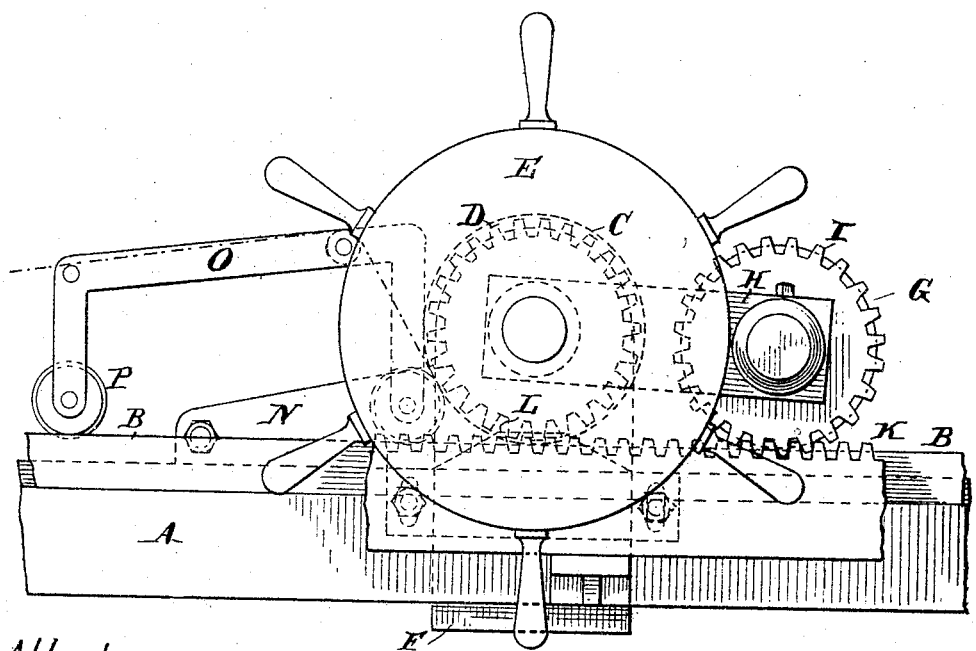
Figure 3:
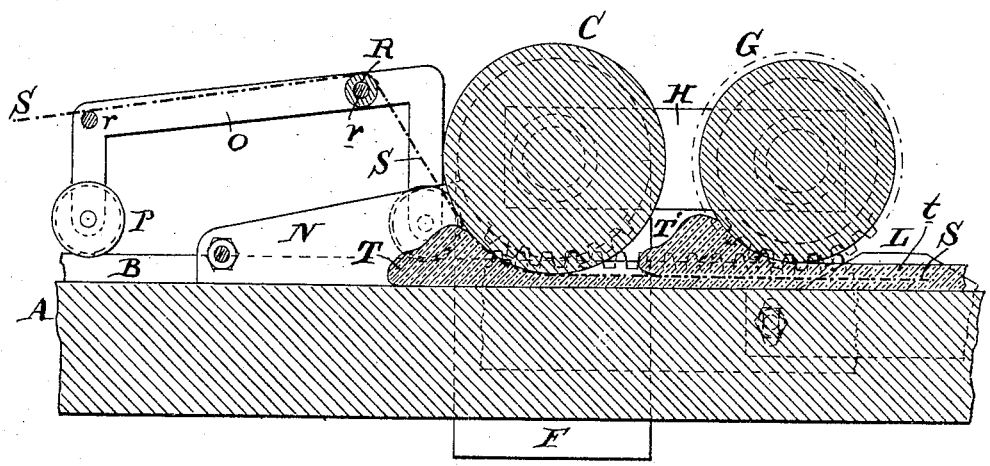

Figure 1 is a side elevation of the said apparatus or machine. Fig. 2 is a similar view, but with the rollers in position on the table for forming the division of the molten glass. Fig. 3 is a sectional elevation on lines 3 3 of Fig. 4, showing the apparatus in act of rolling a plate of glass with the meshed wire in place; and Fig. 4 is a cross-section through the table and with a portion of the rear roll broken away.

I will first describe the apparatus and then explain its operation in carrying my improved process into effect.

A is the table or bed upon which the glass is rolled and is provided on its lateral edges with the guide-strips B B, upon which the rollers C and G travel. Secured to the sides of this table are the racks K K. The rollers C and G are connected together by side frames H H, in which they are journaled, and are respectively provided with gears D and I, adapted to mesh with the racks K K. The forward roller C is somewhat heavier than the rear roller G and is provided with a hand-wheel E for rotating it and causing it to travel over the table upon the guide-strips. A counterweight F may be loosely suspended upon the opposite end of the roller to counterbalance the weight of the hand-wheel. As the roller C is fed over the table the rear roller G is pulled after it by the frames H H, and the gears upon the said rollers traveling in the racks K K make the rollers move evenly at the same rates of speed and with a positive motion no matter what resistance may be offered by the molten glass.

Figure 4:
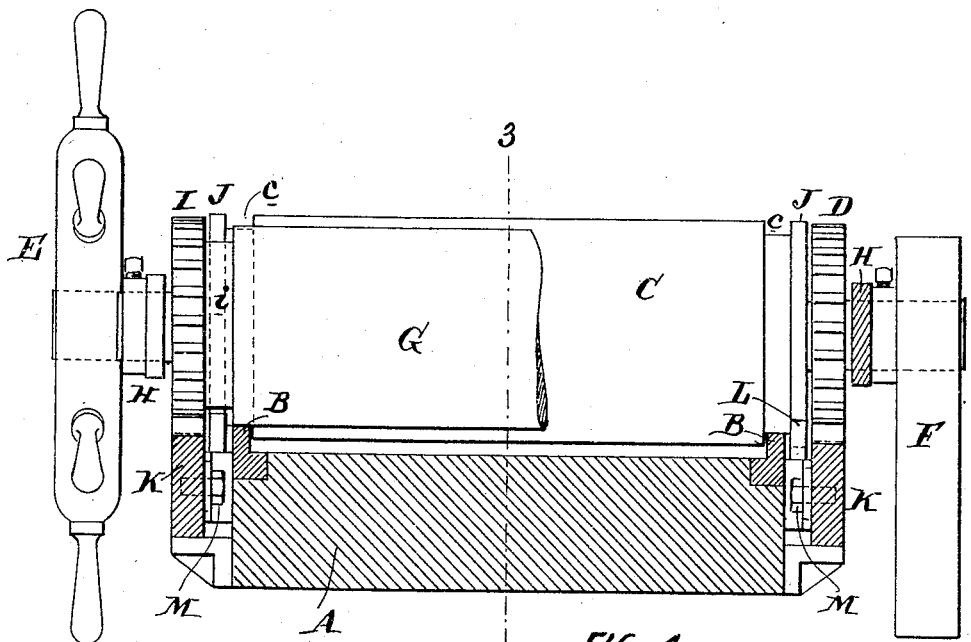

The roller C is provided near each end with an annular groove or channel *c*, forming rolling surfaces of less diameter than the body of the roller and adapted to roll upon the guide-strips B B, so as to lower the lower surface of the roller below the upper surface of the guide-strips, as shown in Fig. 4. The roller G is made to run upon the guide-strips, and having no grooves corresponding to those of the roller C the lower surface of its body is caused to travel at a higher plane than the lower surface of roller C, as also indicated in Fig. 4.

L L are two cams and are bolted to the sides of the racks K K by bolts M, extending through slots *m*, which permit of adjustment for the purpose of raising or lowering the said cams in adjusting the machine. The roller C has its ends made with the cylindrical portions J, which operate to roll upon the cams for the purpose of raising the roller during the act of passing over the cams, said action being to cause the roller to pass over a mass of the glass on the table, and thereby leave it to be operated upon by the second or rear roller G.

N is the usual plow which is guided upon the table between the guide-strips B B and is pushed forward by the roller C.

The meshed wire S is guided and fed into the apparatus by a frame O, running upon flanged wheels P, traveling upon the guide-strips B B. Cross-rods $r$ hold the two side frames O together, and a roller R at the upper rear end acts as a guide over which the said meshed wire S is fed. The rod $r$ and roller R support the body of the meshed wire, and the end is extended down in front of and under the roller C, as shown in Fig. 3.

With the apparatus as shown in Fig. 1 the mass of molten glass is placed upon the table A within the plow N and in front of the roller C. The rollers are now moved forward, and the cams L cause the roller C to rise above the glass and pass over a material portion of same. It then descends and divides the glass into substantially two parts and begins to roll the left-hand portion, or that in front of it, at the same time rolling the meshed wire down upon the surface of the glass layer. The rear roller G immediately follows and acting upon the glass left by the roller C forces it forward and rolls it down upon the meshed wire and lower layer of glass, as shown in Fig. 3. This upper layer of glass is indicated at $t$. In this manner there are two layers of glass rolled in succession from independent bodies of glass, the second layer being rolled out upon the first and lower layer and over the meshed wire, and as this is done in rapid succession and as a continuous operation the molten layers of glass are caused to adhere and coalesce through the meshes of wire and constitute a single plate with the meshed wire completely embedded in it. To prevent the rear roller G being acted upon by the cams L L when adjusted high, I prefer to form grooves $i$ at the ends of the roller next to the gears I, as shown in Fig. 4.

I do not confine myself to the use of any specific means or apparatus for carrying my process into effect, as my invention comprehends, broadly, the employment of two parts of glass successively rolled one upon the other with the meshed wire between them.

In this application I do not claim the apparatus illustrated, as that is reserved for a separate application.

Having now described my invention, what I claim as new, and desire to secure by Letters Patent, is—

1. The method of making sheet-glass with a metallic center portion, consisting in depositing a single batch of glass upon a suitable support, then dividing it into a front and a rear portion, introducing the metallic center at the divided point, then spreading the front portion of the glass below the metallic center and the rear portion above the metallic center.

2. The method of making sheet-glass with a metallic center portion which consists in depositing a single batch of glass upon a suitable support, then dividing it into a front and a rear portion, introducing the metallic center at the divided point, and simultaneously spreading the front portion of the glass under the metallic center and the rear portion above the metallic center.

In testimony of which invention I have hereunto set my hand.

FRANK SHUMAN.

Witnesses:
R. M. KELLY,
ERNEST HOWARD HUNTER.